(12) United States Patent
Toyota

(10) Patent No.: US 7,516,999 B2
(45) Date of Patent: Apr. 14, 2009

(54) SEAT DEVICE FOR VEHICLE

(75) Inventor: Minoru Toyota, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 434 days.

(21) Appl. No.: 11/126,142

(22) Filed: May 11, 2005

(65) Prior Publication Data

US 2005/0269853 A1  Dec. 8, 2005

(30) Foreign Application Priority Data

Jun. 3, 2004  (JP) ............................. 2004-165683

(51) Int. Cl.
*B60N 2/02* (2006.01)
(52) U.S. Cl. .............. 296/65.13; 296/65.05; 296/65.16; 297/378.1; 297/331
(58) Field of Classification Search ............. 297/378.1, 297/340, 325, 326, 331, 335, 317, 316, 234, 297/235; 296/65.09, 65.05, 65.01, 65.16, 296/65.13

See application file for complete search history.

(56) References Cited

U.S. PATENT DOCUMENTS 5,492,386 A * 2/1996 Callum ........................ 296/64
6,582,003 B2 * 6/2003 Fourrey et al. ................. 296/64
6,626,481 B2 * 9/2003 Kawasaki ................. 296/65.01
2004/0100117 A1  5/2004 Rhodes et al.

FOREIGN PATENT DOCUMENTS

| EP | 0 982 184 A2 | 3/2000 |
|---|---|---|
| EP | 1 400 399 A1 | 3/2004 |
| JP | 10-35334 | 2/1998 |
| JP | 2003-226175 | 8/2003 |
| WO | WO 91/18778 | 12/1991 |
| WO | WO 00/41911 | 7/2000 |

OTHER PUBLICATIONS

European Search Report dated Sep. 22, 2005.

* cited by examiner

*Primary Examiner*—Milton Nelson, Jr.
(74) *Attorney, Agent, or Firm*—Studebaker & Brackett PC; Donald R. Studebaker

(57) ABSTRACT

The seat device, disposed on the floor panel in the cabin with the instrument panel, comprises the driver seat, the assistant seat and the rear seat, wherein the assistant seat is foldable and movable forward close to the instrument panel to be located in the stored position where the length of the folded seat is made short, the rear seat is foldable and movable forward to be located in the stored position, and the assistant seat in the stored position and the rear seat in the stored position provide the substantially continuous storage space which is formed by back faces of respective seat backs and of the assistant seat and the rear seat. Thus, both the large space and the roomy cabin for passengers can be improved.

9 Claims, 15 Drawing Sheets

SEAT DEVICE FOR VEHICLE

BACKGROUND OF THE INVENTION

The present invention relates to a seat device for a vehicle which comprises a driver seat, an assistant seat and a rear seat disposed behind them.

Conventionally, various types of seat devices for a vehicle comprising the driver seat, the assistant seat and the rear seat disposed behind them have been devised.

For example, Japanese Patent Laid-Open Publication No. 2003-226175 discloses the seat device for a vehicle in which a recess portion is formed at a potion of an instrument panel in front of the assistant seat. Herein, in the case where the assistant seat with a seat cushion and a seat back is stored, the seat back with a headrest is inclined forward by a specified angle with respect to the seat cushion located substantially horizontally and then the assistant seat is moved forward to its front stored position, where the front portion of the seat cushion is located below the instrument panel and the headrest on the seat back is just located in the above-described recess portion formed at the instrument panel. Thus, the assistant seat can be stored along and close to the instrument panel.

The above-described seat device has an advantage that this forward-moved assistant seat can provide a load space on a floor panel between the rear end of the assistant seat and the rear seat. However, the rear seat of this conventional seat device is provided on a rear floor (load floor), which is formed at rear of the floor panel via a kickup portion and positioned at a higher level than the floor panel. Accordingly, this may cause a large difference in level between the floor panel and a seat cushion of the rear seat, and thereby a flat load space could not be obtained properly.

Japanese Patent Laid-Open Publication No. 10-35334 discloses the seat device for a vehicle in which there are provided a rear floor, a floor portion at a higher level, and a load floor at a further higher level, and a seat cushion of a rear seat is provided on the floor portion and a seat back of the rear seat is attached to a front end of the load floor via hinges. Herein, a front row seat is moved forward, and then the seat cushion of the rear seat is rotated forward and the seat back of the rear seat is located on the above-described floor portion via the hinges. Thus, the seat cushion of the rear seat is located horizontally in the longitudinal direction, and back faces of the seat cushion and seat back of the rear seat and the load floor are made flat. Accordingly, a continuous and relatively large load space can be formed.

In the above-described conventional seat device for a vehicle, however, there may occur a gap between the rear end of the front row seat moved forward and the front end of the seat cushion of the rear seat rotated forward. Also, the front row seat is moved forward, just maintaining its normal use (sitting) position. Accordingly, this conventional seat device still has a problem that a sufficiently large, flat and continuous load space could not be obtained.

SUMMARY OF THE INVENTION

The present invention has been devised in view of the above problems, and an object of the present invention is to provided a seat device for a vehicle which can form the sufficiently large, flat and continuous load space in the longitudinal direction in the cabin, thereby improving both the large load space and the roomy cabin for passengers.

According to the present invention, there is provided a seat device for a vehicle, which is disposed on a floor panel in a cabin equipped with an instrument panel at a front side, comprising a driver seat, an assistant seat provided beside the driver seat, the assistant seat being foldable and movable forward close to the instrument panel so as to be located in a stored position thereof in which a length of the folded seat is made short, and a rear seat provided behind the assistant seat, the rear seat being foldable and movable forward so as to be located in a stored position thereof which is located behind the stored position of the assistant seat, wherein the assistant seat in the stored position and the rear seat in the stored position provide a substantially continuous storage space thereon which is formed by back faces of respective seat backs of the assistant seat and the rear seat.

The above-described assistant seat in the stored position may be configured by an operation (tip-up) in such a manner that the seat cushion thereof is raised in an upright position facing to the seat back. According to this structure, the assistant seat is folded and moved forward to its stored position close to the instrument panel, where the length of the folded seat is made short. Meanwhile, the rear seat is folded and moved forward to its stored position with the seat back on the seat cushion thereof. Thereby, the back faces of respective seat backs of the assistant seat and the rear seat are formed in a substantially L shape.

Accordingly, a continuous storage space is formed so as to extend from an original position of the assistant seat in use to a rear position in the cabin, by the assistant seat in its stored position and the rear seat in its stored position. Thus, the large, flat and continuous load space can be formed in the longitudinal direction in the cabin, thereby improving both the large load space and the roomy cabin for passengers.

According to a preferred embodiment, there is provided a load floor in back of the rear seat which is located at a higher level than the floor panel, and a substantially continuous load space is formed by the back face of the seat back of the rear seat in the stored position and the load floor.

According to this structure, since the back face of the seat back of the rear seat and the load floor are continuous, the flat and large load space can be formed so as to be used properly. Also, the continuous load floor formed can improve the quality and storing function of the load space properly.

According to another preferred embodiment, a headrest is provided at a top portion of the seat back of the rear seat, and the rear seat is configured such that the headrest of the rear seat in the stored position is located between the assistant seat in the stored position and the floor panel.

According to this structure, since the headrest of the rear seat is located between the assistant seat in the stored position and the floor panel, there can be also a continuous face in the vehicle width direction.

According to another preferred embodiment, the rear seat is configured such that a lower end of the assistant seat in the stored position contacts a front end of the seat back of the rear seat in the stored position.

According to this structure, since substantially no gap exits between the lower end of the assistant seat in the stored position and the front end of the seat back of the rear seat in the stored position, the utility and appearance can be improved properly.

According to another preferred embodiment, there is provided a slide rail which supports the assistant seat movably between the above-described forward stored position and a backward position near the load floor.

Herein, this slide rail may be attached to a tunnel portion and a side sill. According to this structure, since the assistant seat is movable in the longitudinal direction between the forward stored position and the backward position near the load floor, a proper seat arrangement can be provided.

Other features, aspects, and advantages of the present invention will become apparent from the following description which refers to the accompanying drawings.

DETAINED DESCRIPTION OF THE INVENTION

Figure 1:
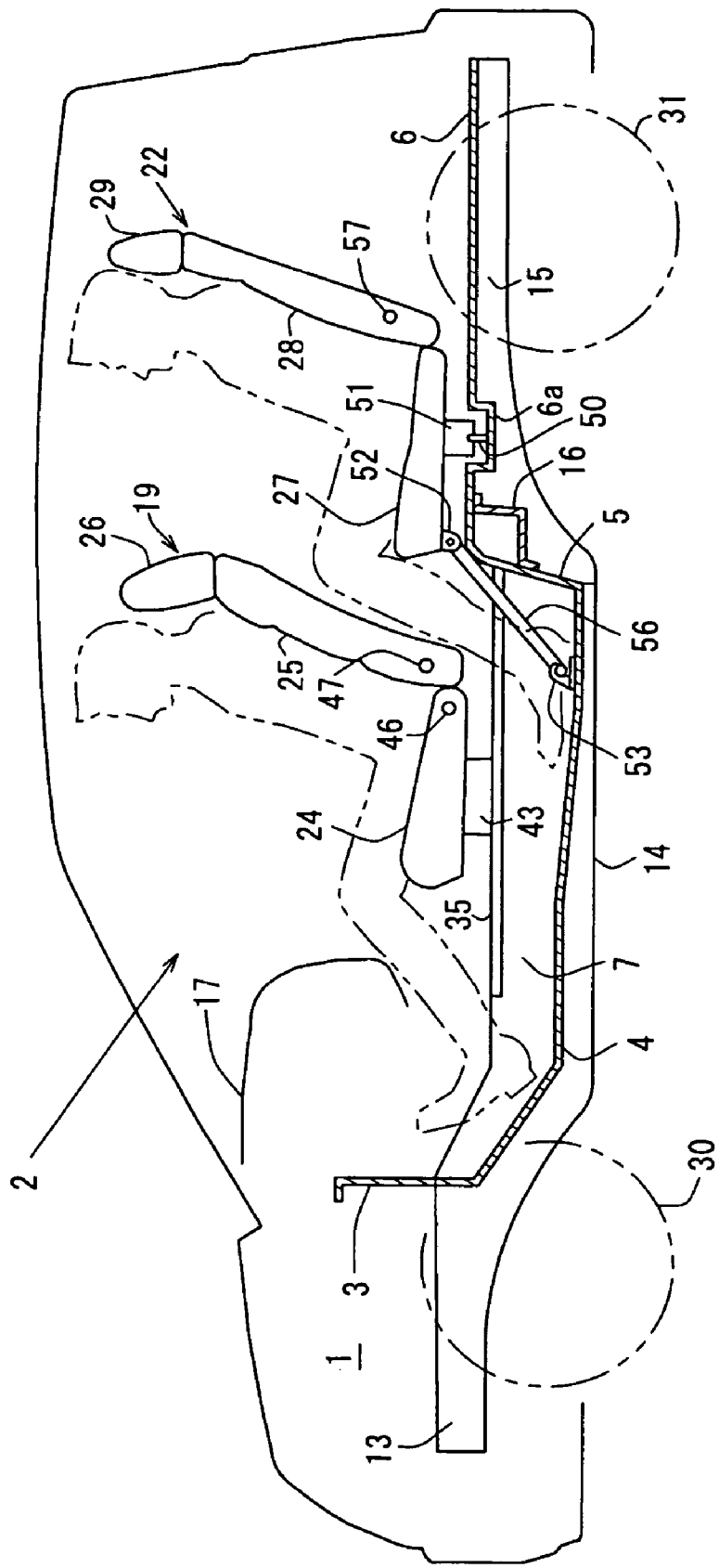
FIG. 1 is a side view of a vehicle equipped with a seat device for a vehicle according to the present invention.

Hereinafter, preferred embodiments of the present invention will be described referring to the accompanying drawings. It should be understood that even though embodiments are separately described, single features thereof may be combined to additional embodiment.

The drawings illustrate a seat device for a vehicle. First, a vehicle body structure will be described referring to FIGS. 1, 2 and 3. There is provided a dash lower panel (dash panel) 3 which separates a cabin 2 from an engine room 1 longitudinally. A floor panel 4 is connected to a lower end of the dash panel 3 so as to extend rearward substantially horizontally. A rear floor 6 is connected to a rear portion of the floor panel 4 via a kickup portion 5. The rear floor 6 is located at a higher level than the floor panel 4.

Figure 5:
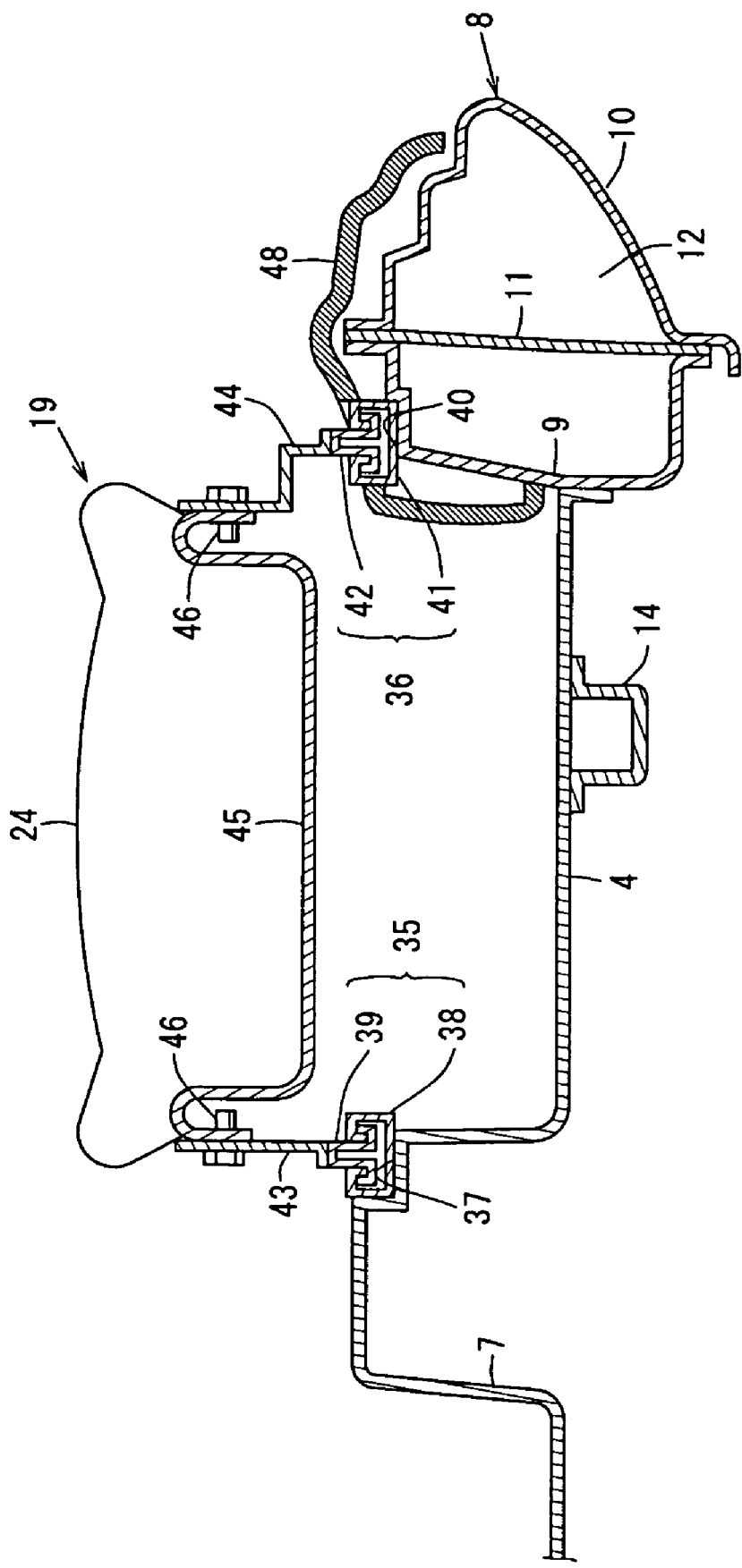
FIG. 5 is a view seen along line A-A of FIG. 4.

At a central portion of the floor panel 4 is integrally formed a tunnel portion 7 so as to project toward an inside of the cabin 2 and extend in a longitudinal direction. And, at both sides of the floor panel 4 are fixed side sills 8, 8, as vehicle-body rigidity members. Each side sill 8 comprises, as illustrated in FIG. 5, a side sill inner 9, a side sill outer 10 and a side sill reinforcement 11, which form a side sill closed section 12 extending longitudinally.

Figure 2:
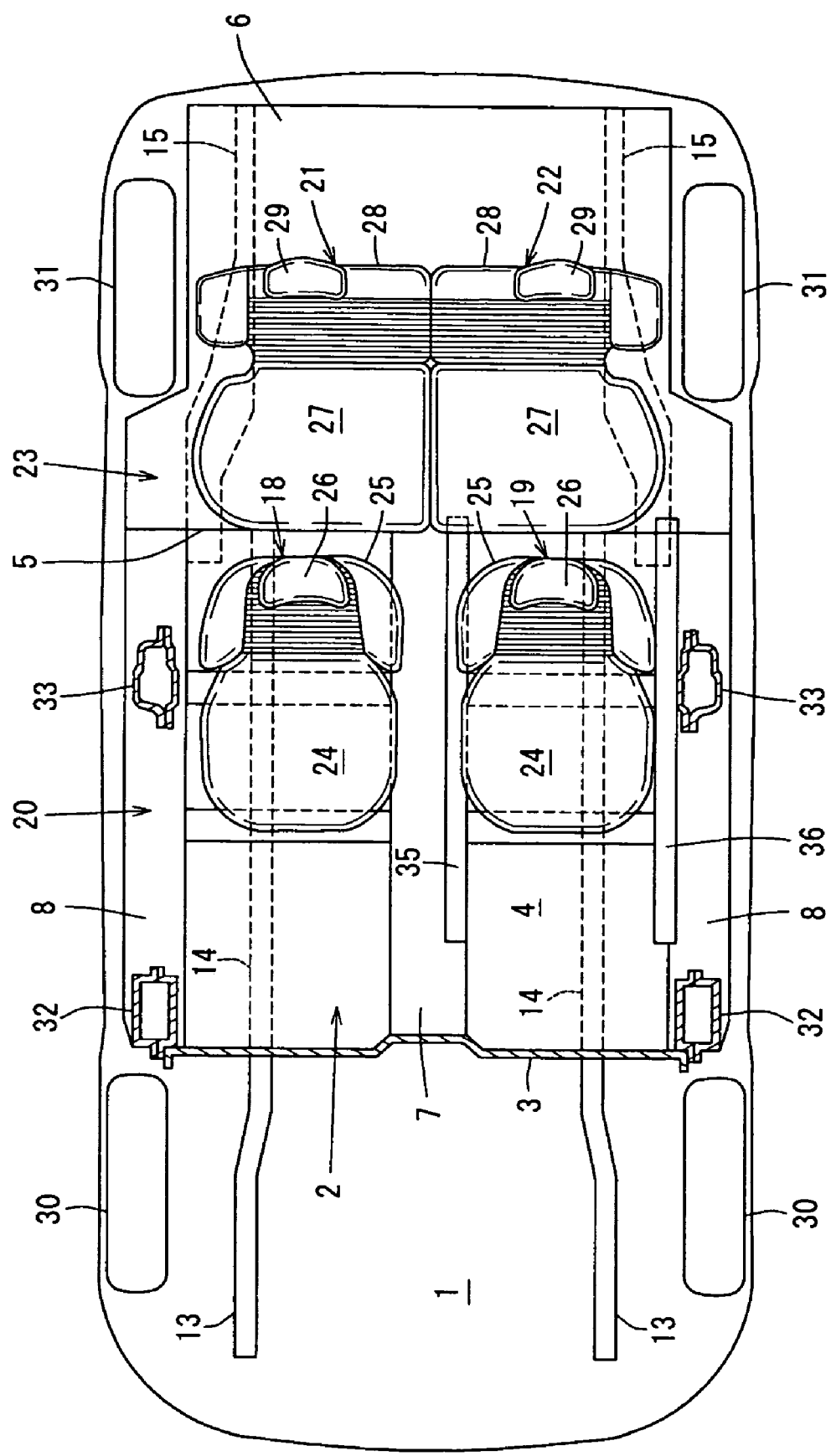
FIG. 2 is a plan view of a major portion of FIG. 1.

Meanwhile, as illustrated in FIGS. 1 and 2, a pair of front side frames 13, 13 (front frames) is provided so as to extend in the longitudinal direction at both sides in the engine room 1. Rear portions of the front side frames 13, 13 are formed along the dash lower panel 3, and their rear end portions are continuously connected to a pair of floor frames 14, 14 which extends longitudinally.

These front side frames 13, 13 and floor frames 14, 14 functions as vehicle-body rigidity members. The floor frames 14, 14 are fixed to a lower face of the floor panel 4 of the floor panel 4 to form closed cross sections extending in the longitudinal direction of the vehicle between them 4 and 14.

Also, a pair of rear side frames 15, 15 are fixed to a lower face of the rear floor 6 of to form closed cross sections extending in the longitudinal direction of the vehicle between them 6 and 15. Further, to a corner portion between the kickup portion 5 and the rear floor 6 is fixed a rear cross member 16 which extends in the vehicle width direction.

On the floor panel 4 in the cabin 2 equipped with an instrument panel 17 at the front side are provided a front row seat 20, which comprises a driver seat 18 and an assistant seat 19 provided beside the driver seat 18, and a rear row seat 23, which comprises a right seat 21 and a left seat 22, which are disposed behind the front row seat 20.

The driver seat 18 and the assistant seat 19, which constitute the front row seat 20, include the seat cushions 24, seat backs 25 and headrests 26, respectively. Likewise, the right seat 21 and the left seat 22, which constitute the rear seat 23, include seat cushions 27, their seat backs 28 and headrests 29, respectively.

Figure 3:
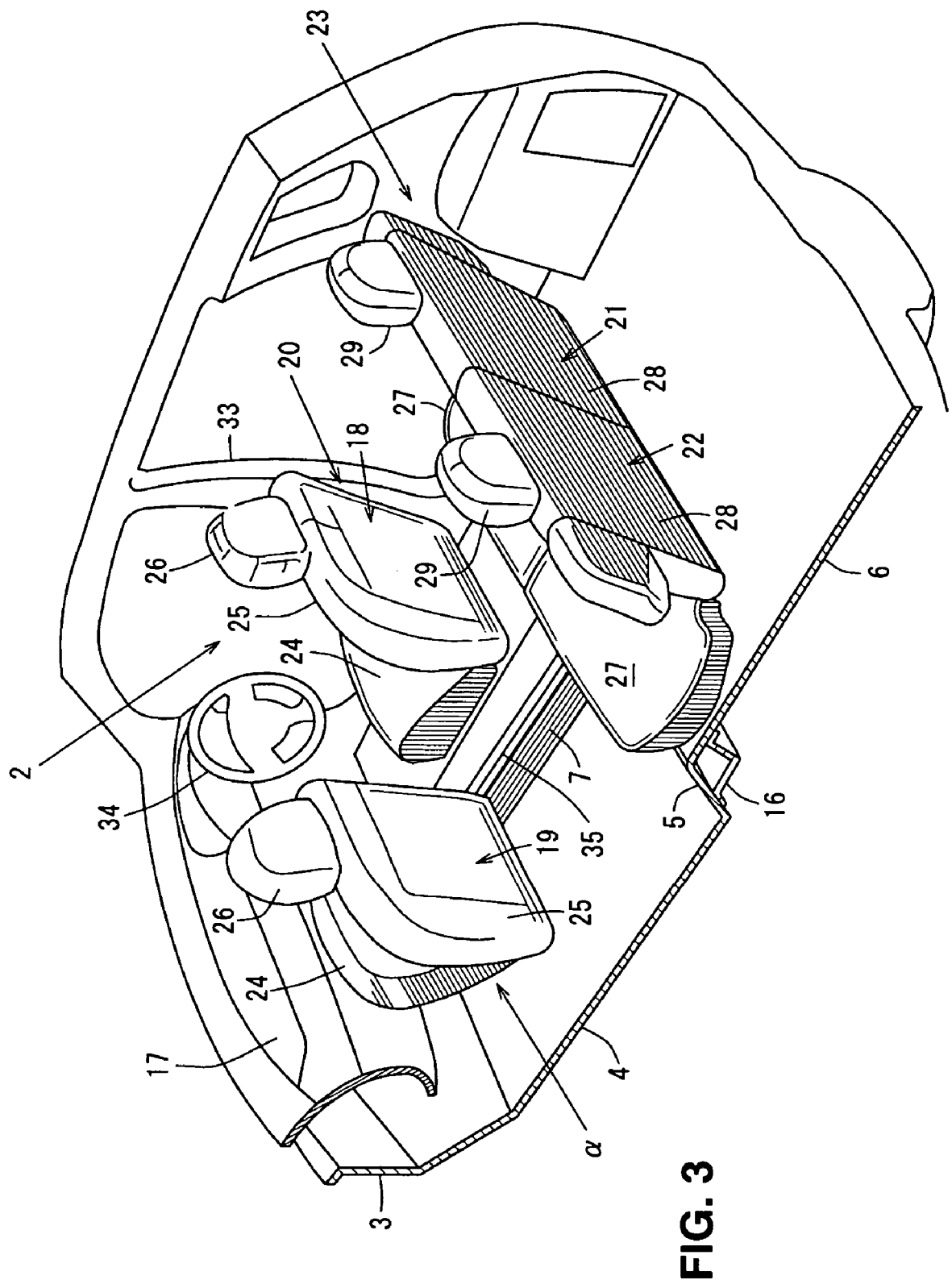
FIG. 3 is a perspective view illustrating a disposition structure of seats.

The above-described rear floor 6 is formed so as to extend from the seat cushions 27 of the rear seat 23 toward the rear of the vehicle. In FIGS. 1 through 3, reference numerals 30 denote vehicle front-wheels, reference numerals 31 denote vehicle rear wheels, reference numerals 32 denote hinge pillars, reference numerals 33 denote center pillars, and reference numeral 34 denotes a steering wheel.

Figure 4:
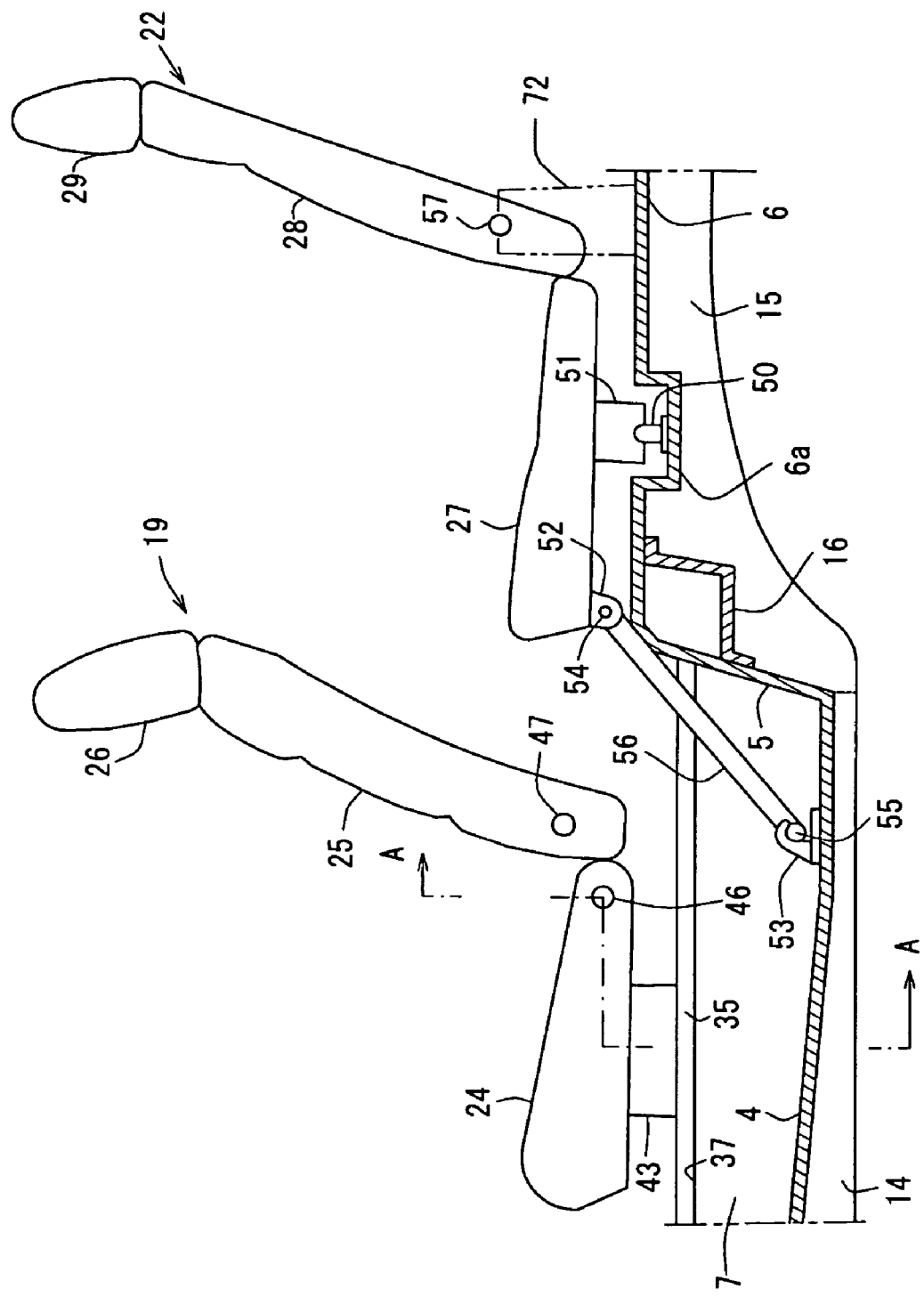
FIG. 4 is an enlarged side view of the major portion of FIG. 1.

Next, the structure of this seat device for a vehicle will be described referring to FIGS. 4 through 10. As illustrated in FIGS. 4 and 5, a pair of slide rails 35 and 36 to guide and move the assistant seat 19 between its forward position close to the instrument panel 17 and its backward position is provided on the tunnel portion 7 and the side sill 8.

A recess portion 37 is formed at a corner portion of the tunnel portion 7 at the side of the assistant seat. A lower rail 38 extending longitudinally is fixed in the recess portion 37, and an upper rail 39 is provided so as to be supported by and move along the lower rail 38. These lower rail 38 and upper rail 39 constitute the seat slide rail 35.

Likewise, a recess portion 40 is formed at a corner portion of the side sill inner 9 of the side sill 8 at the side of the assistant seat. A lower rail 41 extending longitudinally is fixed in the recess portion 40, and an upper rail 42 is provided so as to be supported by and move along the lower rail 41. These lower rail 41 and upper rail 42 constitute the seat slide rail 36.

In order to constitute the assistant seat 19 being movable longitudinally along the above-described seat slides 35 and 36, support members 43 and 44 are attached to the both upper rails 39 and 42, and a seat pan 45 of the assistant seat 19 is pivotally supported at these support members 43 and 44 via pivots 46, 46.

The assistant seat 19 is configured so as to be foldable by an operation (tip-up) in such a manner that the seat cushion 24 is rotated around the pivot 46 and raised in its upright position facing to the seat back 25 as illustrated in FIG. 3. In this position of the assistant seat 19, a length of the folded assistant seat 19 is made short.

Also, the assistant seat 19 is configured such that the seat back 25 is changed to its reclined position via another pivot 47 for reclining.

Meanwhile, as illustrated in FIG. 5, there is provided a scarf plate 48 which covers upper and side portions of the side sill inner 9, a connecting portion of the side sill inner 9 and the side sill outer 10, and an upper portion of the side sill outer 10, except the movable portion of the seat slide rail 39, so as to provide proper appearances.

Figure 8:
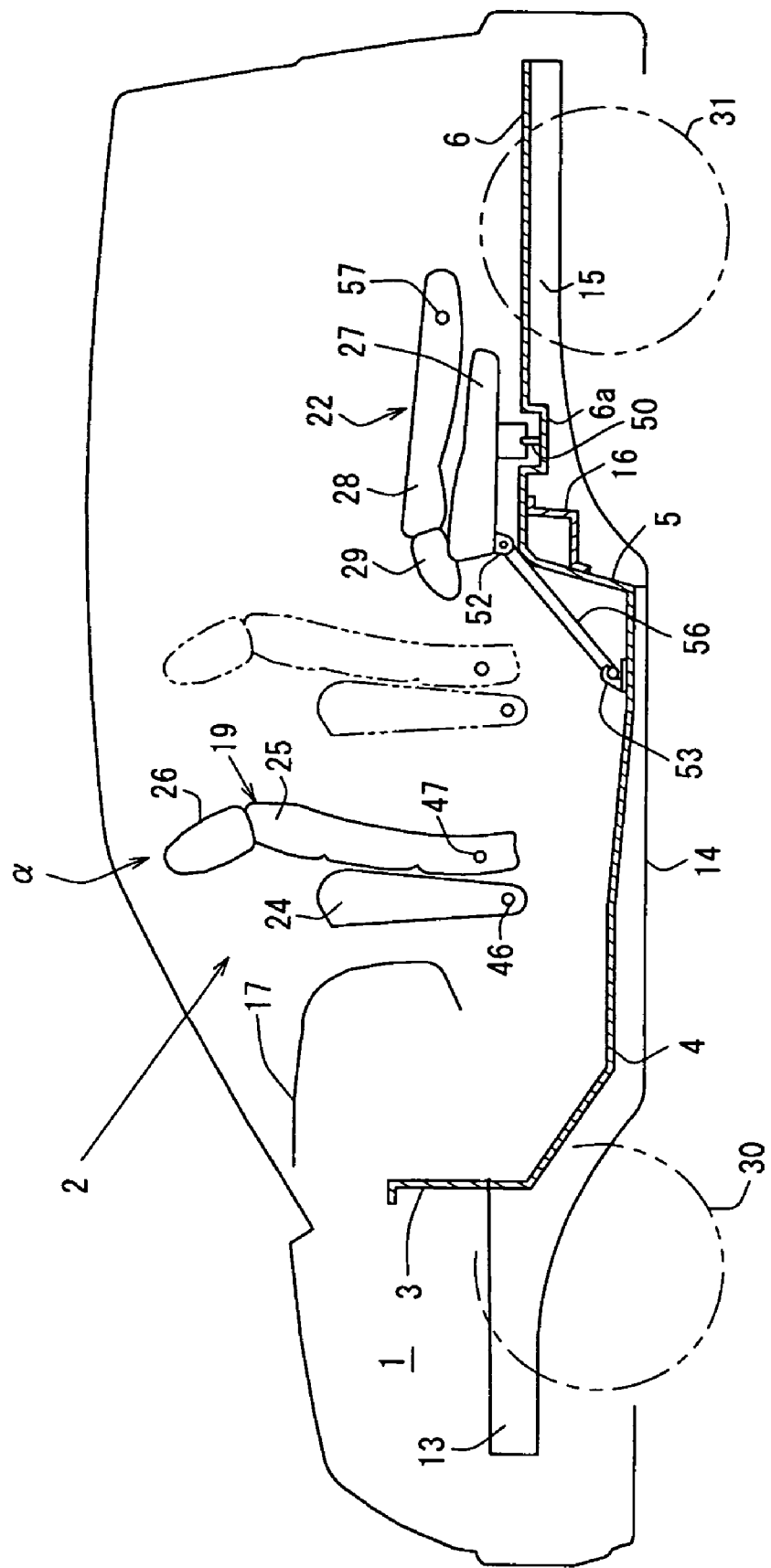
FIG. 8 is a side view illustrating a tip-up state of an assistant seat.

And, the assistant seat 19 can be supported in its forward stored position α, as illustrated in FIGS. 3 and 8, by the tip-up operation and the forward moving along the seat slide rails 35 and 36 close to the instrument panel 17, where the length of the folded seat is made short.

Next, the support structure of the left seat 22 of the rear row seat 23 (i.e., the rear seat located behind the assistant seat 19) will be described referring to FIGS. 4 and 6.

At the rear floor 6 below the seat cushion 27 of the left seat 22 are formed two recess portions 6a, 6a with a specified separate distance from each other in the vehicle width direction. Strikers 50, 50 are fixed in the recess portions 6a, 6a.

Further, there are provided latches 51, 51 at the bottom face of the seat cushion 27 so as to engage with the above-described strikers 50, 50. An engagement of these strikers 50, 50 with latches 51, 51 holds the seat cushion 27 in its sitting position.

Herein, the engagement of the strikers 50, 50 and latches 51, 51 is unlocked (released) by a manual operation of a lock releasing strap or the like. Further, two hinge brackets 52, 52 are attached to the bottom face of the seat cushion 27, where is offset laterally from the above-described latches 51, 51, and two hooks 53, 53 are attached to floor panel 4, where corresponds to the latches 51, 51.

Also, there is provided a pair of links 56, 56 which comprises pins 54, 54 and 55, 55 at both end portions thereof respectively. The links 56, 56 interconnect the upper hinge brackets 52, 52 and the lower hooks 53, 53 via pin connections.

The hinge brackets 52, 52 are pivotally connected at the upper pins 54, 54, respectively, and hooks 53, 53 are pivotally connected at the lower pins 55, 55. These hooks 53, 53 are configured so as to be locked and unlocked with the lower pins 55, 55.

Meanwhile, the seat back 28 of the left seat 22 is supported at the pivot 57 so as to be in the reclined position. Herein, a link structure illustrated in FIG. 7 may be applied instead of the link 56 illustrated in FIG. 6.

Figure 7:
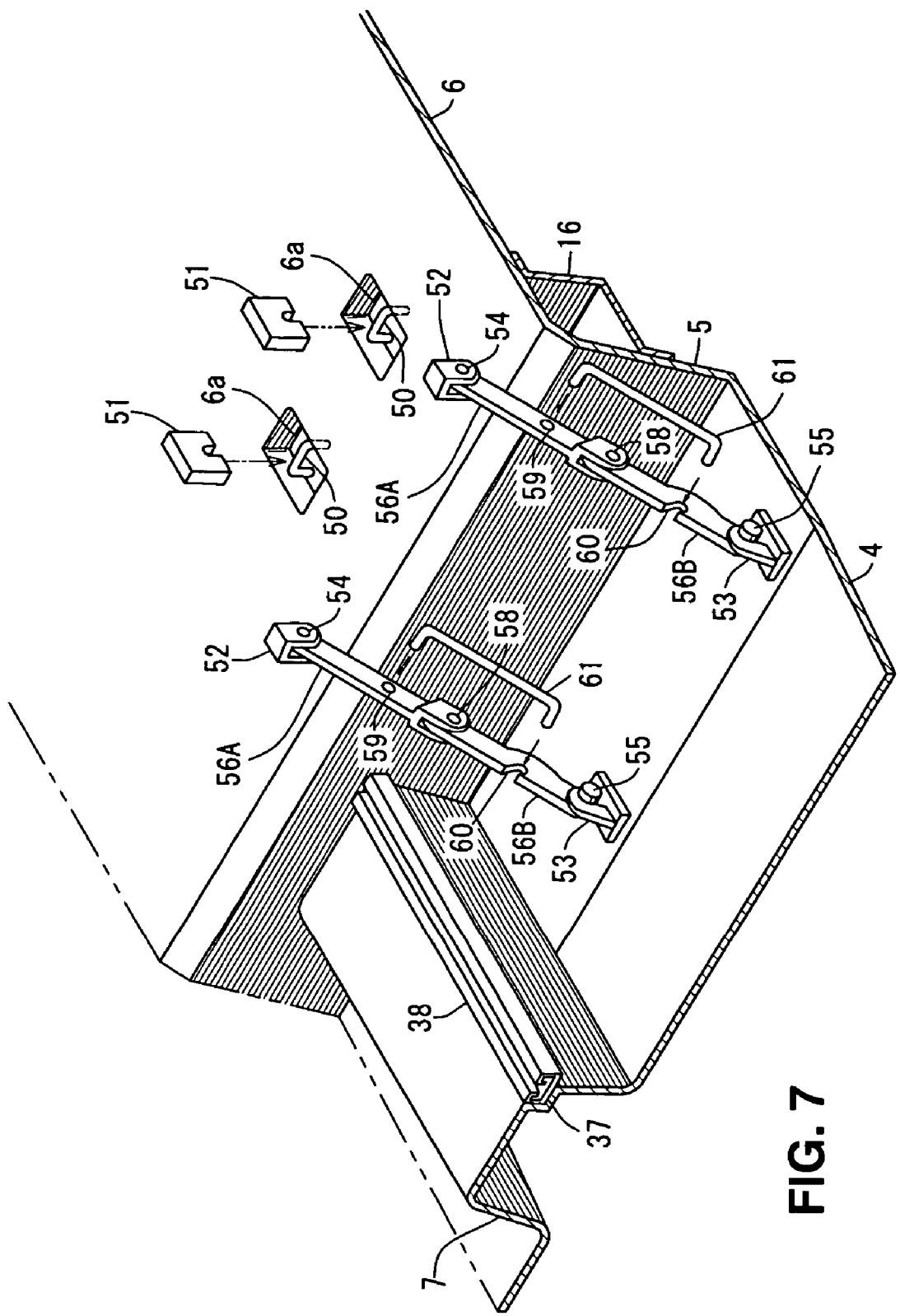
FIG. 7 is a perspective view illustrating another embodiment of the seat device support structure.

In the link structure of FIG. 7, upper links 56A, 56A and lower links 56B, 56B are connected via pivots 58, 58, and there are provided rods 61, 61 which extend between holes 59, 59 formed at the upper links 56A, 56A and notches 60, 60 formed at the lower links 56B, 56B, and lock the rods 61, 61 in their extended positions. Thus, in the case where the left seat 22 is located in the sitting position (see FIG. 4), the rods 61, 61 are provided extending between the holes 59, 59 and the notches 60, 60. Meanwhile, in the case where the left seat 22 is moved to its stored position β (see FIG. 10), which is described below, respective lower portions of the rods 61, 61 are removed from the notches 60, 60, keeping their upper portions inserting in the holes 59, 59, thereby allowing the upper and lower links 56A, 56A and 56B, 56B to be bent. Thus, the operation of the seat for the storing can be improved.

Figure 6:
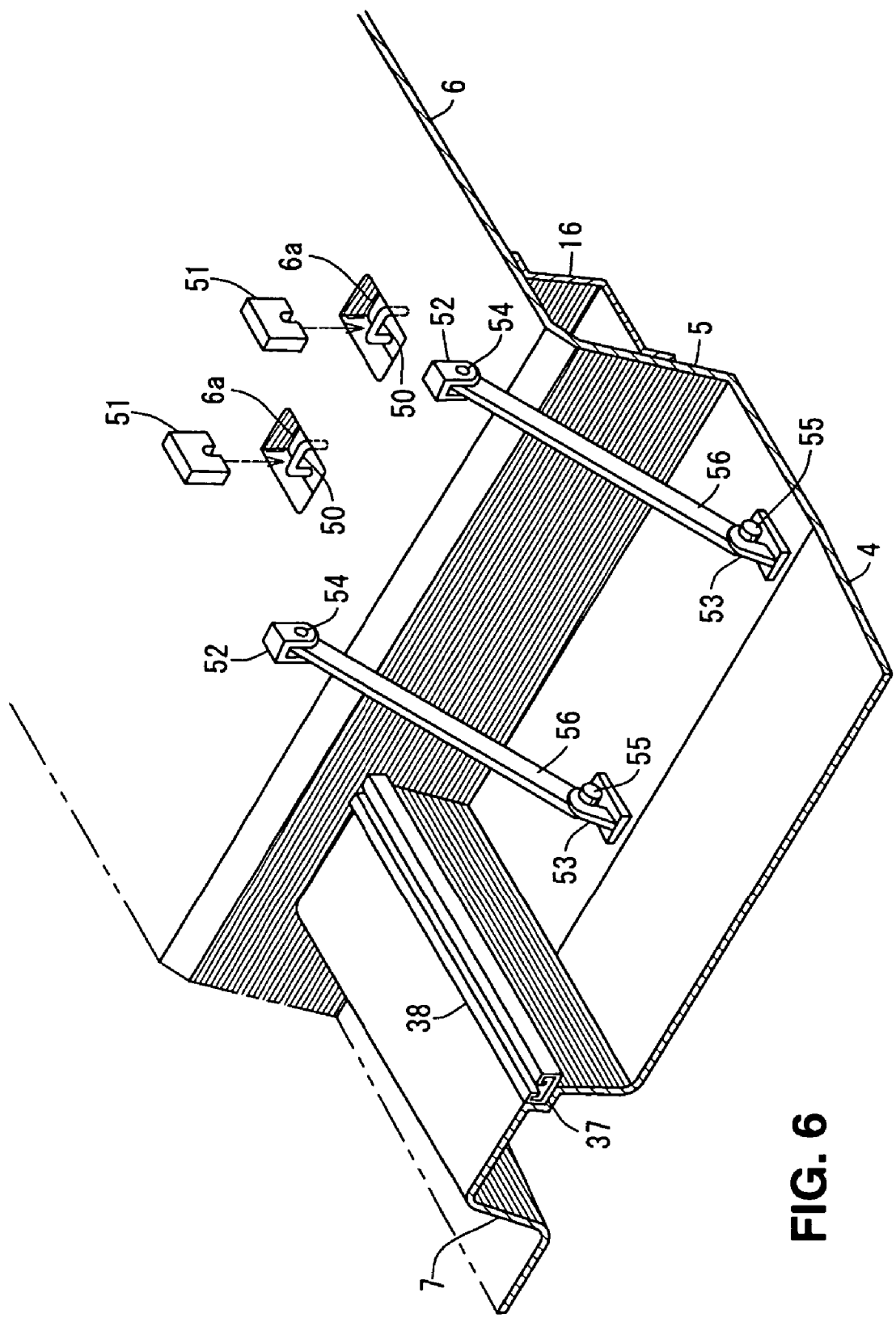
FIG. 6 is a perspective view illustrating a seat support structure.

Herein, the same components as those illustrated in FIG. 6 are denoted by the same reference numerals in FIG. 7, whose detailed descriptions are omitted. Thus, when the assistant seat 19 is located in its stored position α illustrated in FIGS. 3 and 8, the seat back 28 of the left seat 22 is rotated forward and folded on the seat cushion 27 (see FIG. 8) and then moved forward via the links 56, 56 to the stored position β illustrated in FIG. 10, which provides a substantially continuous storage space 70 formed by back faces of the seat back 28 and the seat back 25 of the assistant seat 19, by way of its position state illustrated in FIG. 9.

Figure 10:
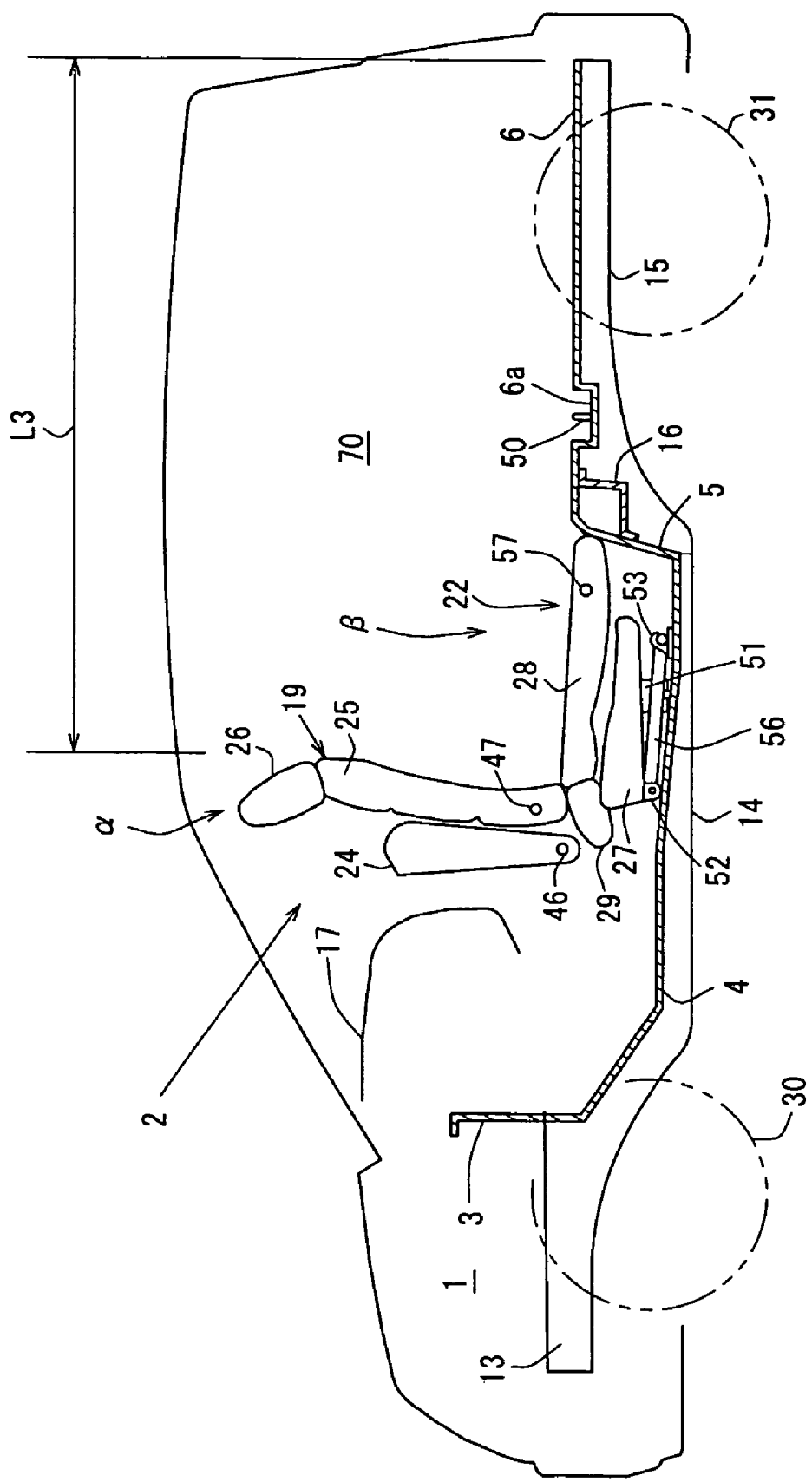
FIG. 10 is a side plan view illustrating the rear seat in its stored position.

Also, when the left seat 22 is located in its stored position β illustrated in FIG. 10, a substantially continuous and flat load space (see a storing space 70) is formed by the back face of the seat back 28 of the left seat 22 and the rear floor 6 as a load floor.

Further, when the left seat 22 is located in its stored position β illustrated in FIG. 10, the headrest 29 of the left seat 22 is located between the assistant seat 19 in the stored position α and the floor panel 4.

Also, when the headrest 29 of the left seat 22 in its stored position β is located between the assistant seat 19 in the stored position α and the floor panel 4 as illustrated in FIG. 10, a lower end of the seat back 25 of the assistant seat 19 in the stored position α contacts a front end of the seat back 28 of the left seat 22 in the stored position β, resulting in substantially no gap exiting between the lower end of the assistant seat 19 and the front end of the seat back 28 of the left seat 22.

The function and effect of this seat device for a vehicle which is configured as described above will be described in detail. In the case where the driver seat 18, assistant seat 19, right seat 21, and left seat 22 are located in their normal use positions respectively as illustrate in FIGS. 1, 2 and 4, passengers can sit on the respective seats, thereby providing comfortable sitting with the passengers.

Meanwhile, in the case where it is required for the assistant seat 19 to be located in the stored position α illustrated in FIG. 3, the seat back 25 of the assistant seat 19 illustrated by a solid line in FIG. 4 is operated so as to be located in its upright position around the pivot 47 and the seat cushion 24 is also tip-up to its upright position, as illustrated by a dotted broken line in FIG. 8, and then the assistant seat 19 is moved along the seat slide rails 35 and 36 to the forward stored position close to the instrument panel 17. Thus, the assistant seat 19 can be located in the stored position α illustrated in FIGS. 3 and 8.

Herein, in order to form the large, flat and substantially continuous load space by locating the left seat 22 of the rear seat 23 in the stored position β (see FIG. 10), the seat back 28 of the left seat 22 in the normal use position illustrated in FIG. 4 is rotated forward around the pivot 57 and folded on the seat cushion 27 as illustrated in FIG. 8.

Figure 9:
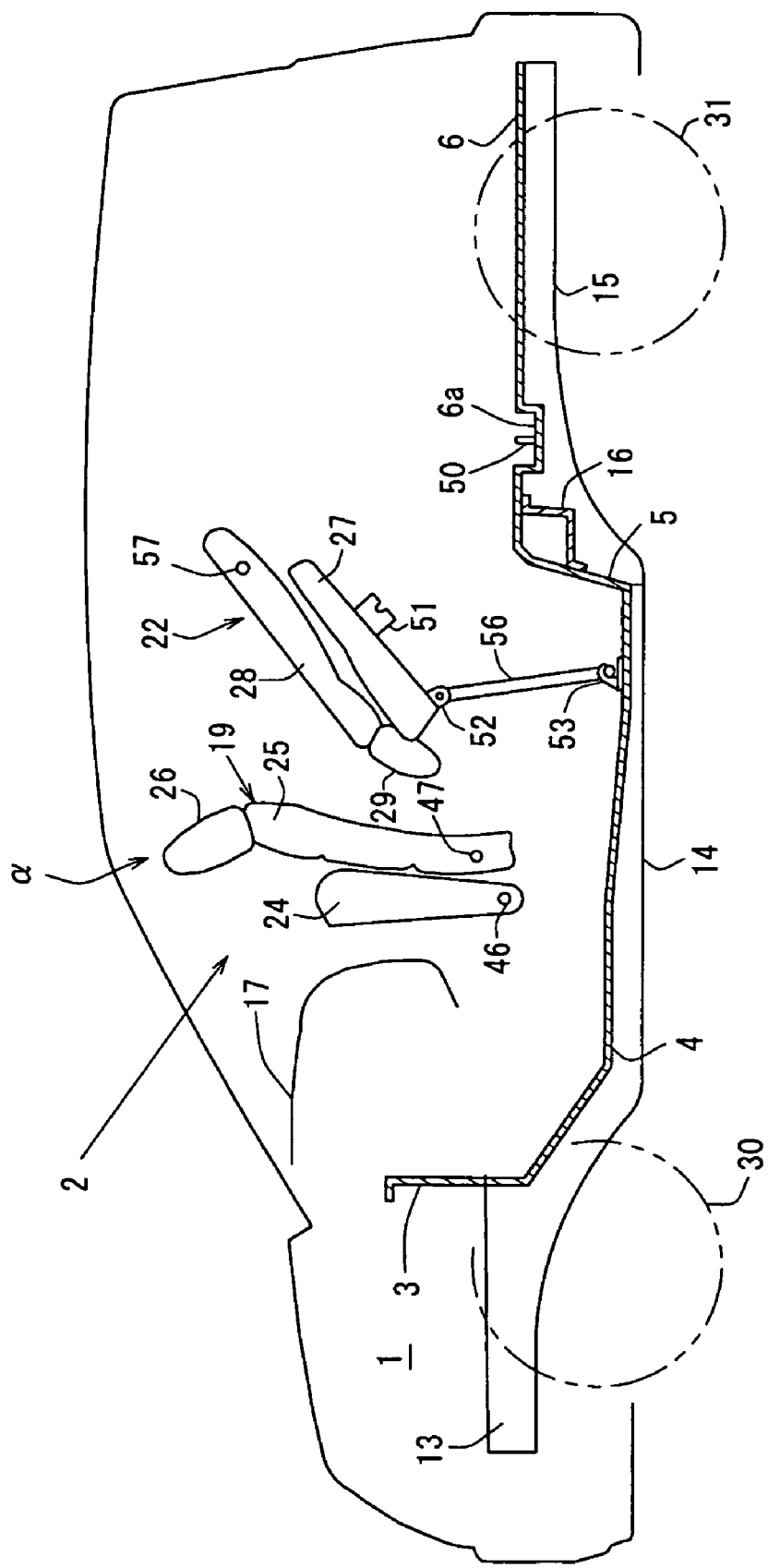
FIG. 9 is a side view illustrating a state of a rear seat on the way to its stored position.

Then, after the latches 51 with strikers 50 are disengaged, the folded left seat 22 is moved forward and upward via the links 56 around the pins 54 and 55 as illustrated in FIG. 9.

Figure 11:
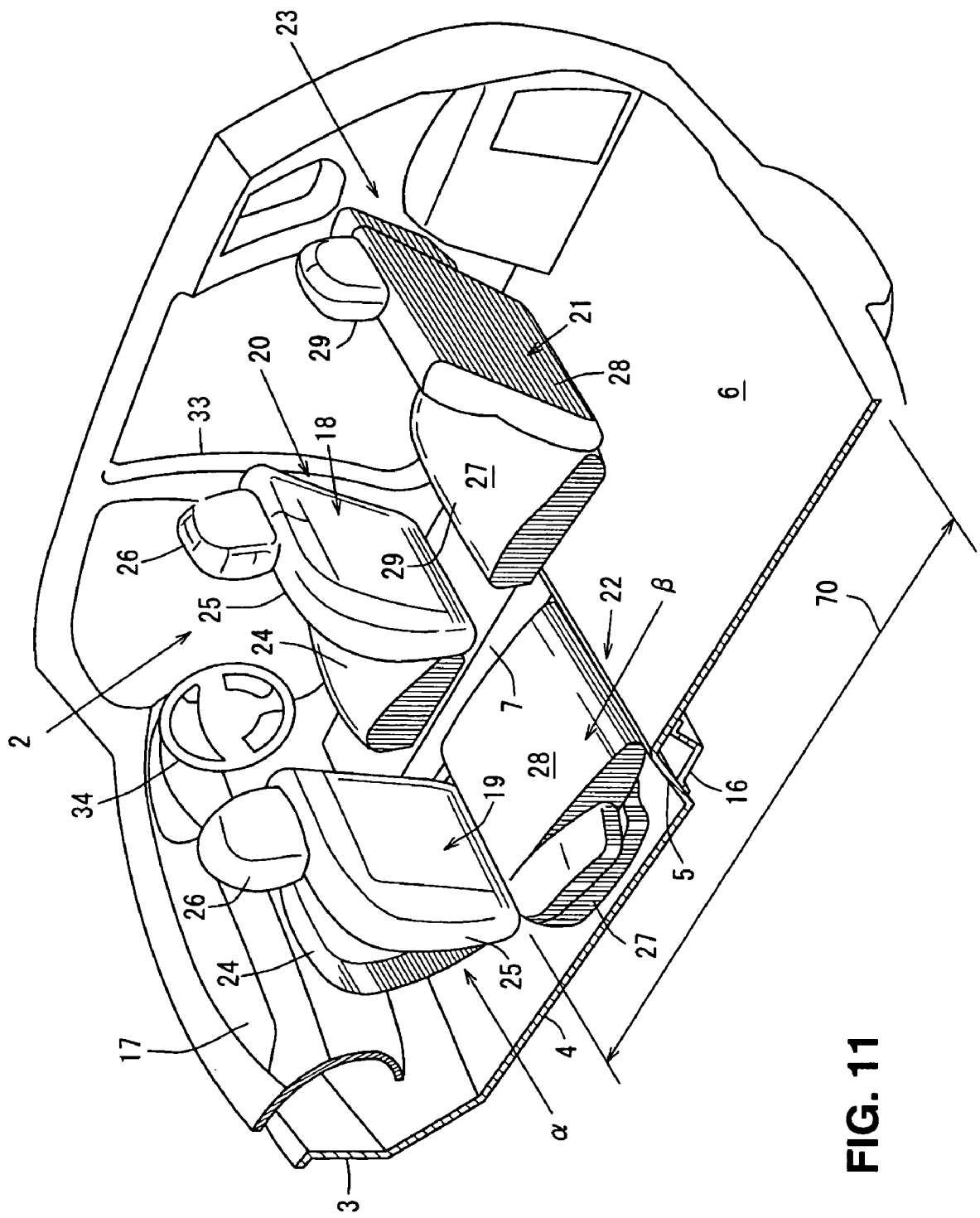
FIG. 11 is a perspective view of FIG. 10.
Figure 12:
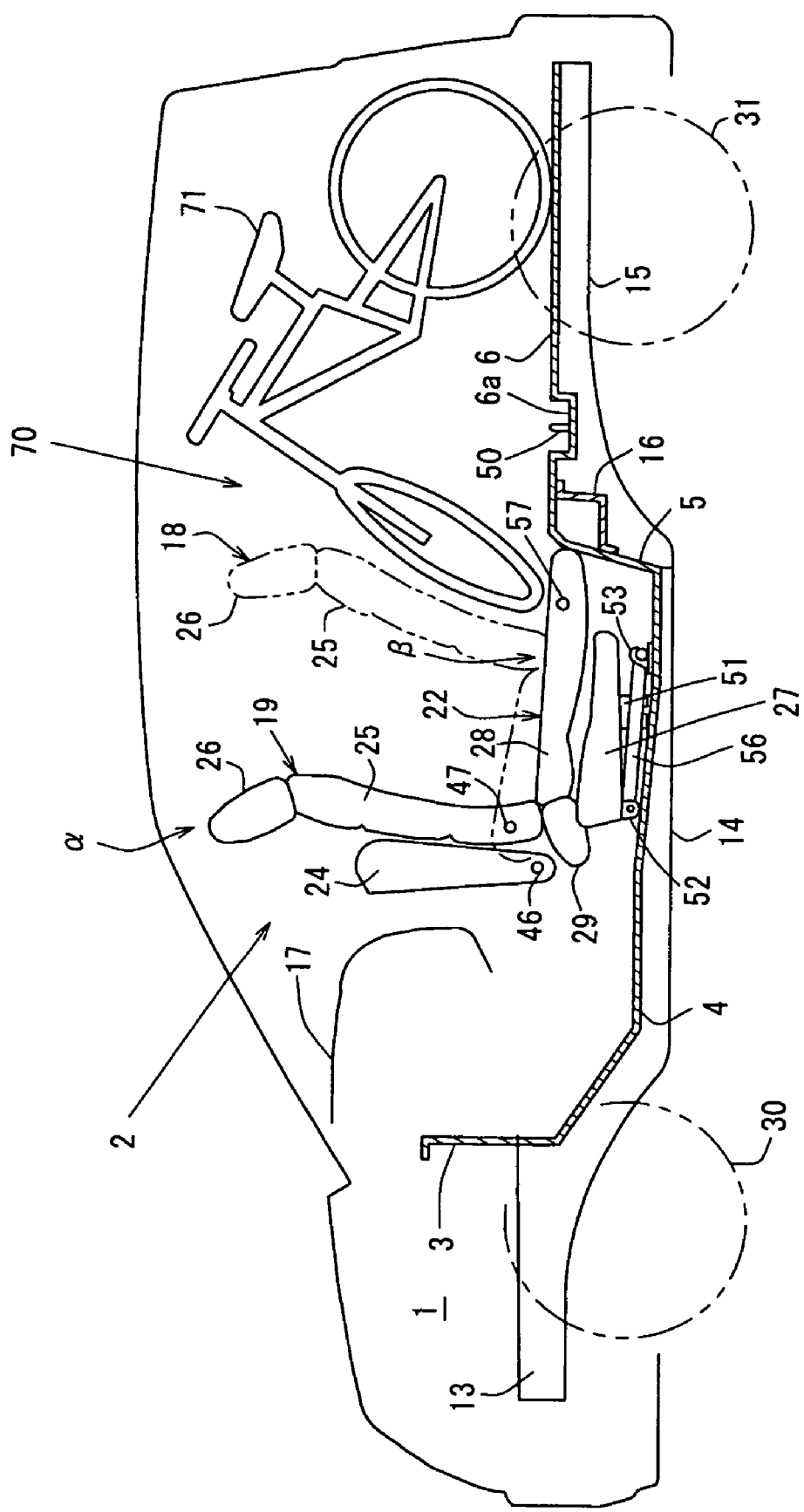
FIG. 12 is a side view illustrating an exemplified loading.

Next, the folded left seat 22 with the seat cushion 27, seat back 28 and headrest 29 is moved downward via the links 56 to its stored position on the floor panel 4 in such a manner that the headrest 29 of the left seat goes down below the seat back 25 of the assistant seat 19 in the stored position α, as illustrated in FIGS. 9 and 10. Thus, the left seat 22 is located in the stored position β. Accordingly, the back face of the seat back 25 of the assistant seat 19 and the back face of the seat back 28 of the left seat 22 are made substantially continuous in the L-shape, and the substantially flat storage space 70 having the maximum length L3 (see FIGS. 10 and 11) is formed by the back face of the seat back 28 of the left seat 22 and the rear floor 6. As a result, relatively tall and long things 71 can be loaded easily (see FIG. 12).

Figure 13:
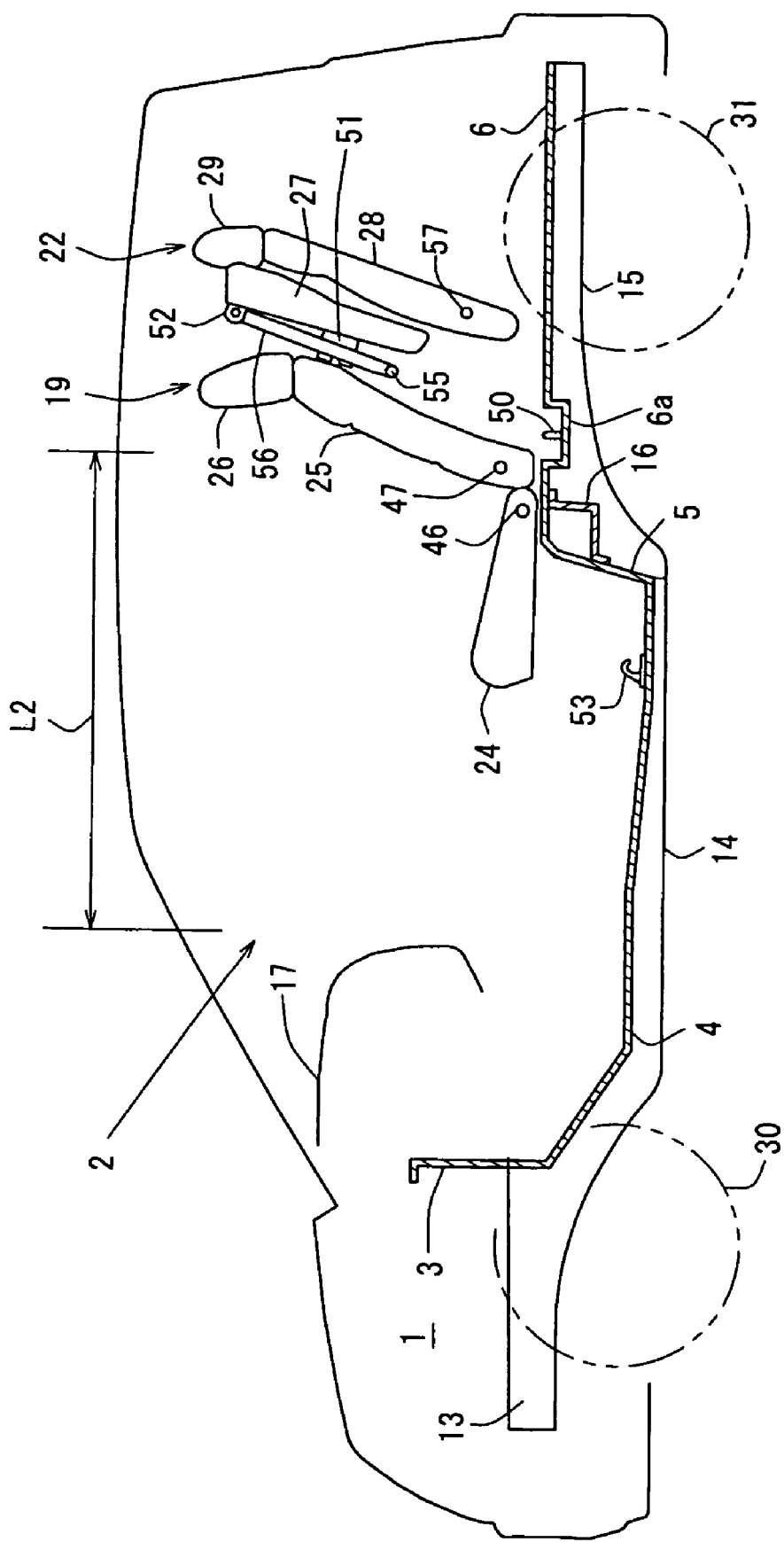
FIG. 13 is a side view illustrating another seat arrangement.

Meanwhile, another seat arrangement illustrated in FIG. 13 can be provided. Namely, the left seat 22 is folded in its tip-up position and the assistant seat 19 is moved rearward along the seat slide rails 35 and 36 to its rear position near the rear floor 6 as illustrated in the figure.

Herein, the left seat 22 can be folded as illustrated in FIG. 13 by disengaging the latches 51 with strikers 50, unlocking the hooks 53 from the pins 55 at the lower end of the links 56, and then raising the seat cushion 27 of the left seat 22 to the upright position facing to the seat back 28 around the pivots 57. The left seat 22 may be held in this position by a proper means. For example, a pair of support members 72, 72, which is illustrated by a dotted broken line in FIG. 4, may be applied to support the left seat 22 via the above-described pivots 57.

After the left seat 22 has been folded as illustrated in FIG. 13, the assistant seat 19 is moved rearward along the seat slide rails 35 and 36 to the rear position near the rear floor 6.

Since there can be provided a relatively long distance L2 between the instrument panel 17 and the seat back 25 of the assistant seat 19 in this arrangement illustrated in FIG. 13, the comfortable sitting for the passenger on the assistant seat 19 can be obtained.

Figure 14:
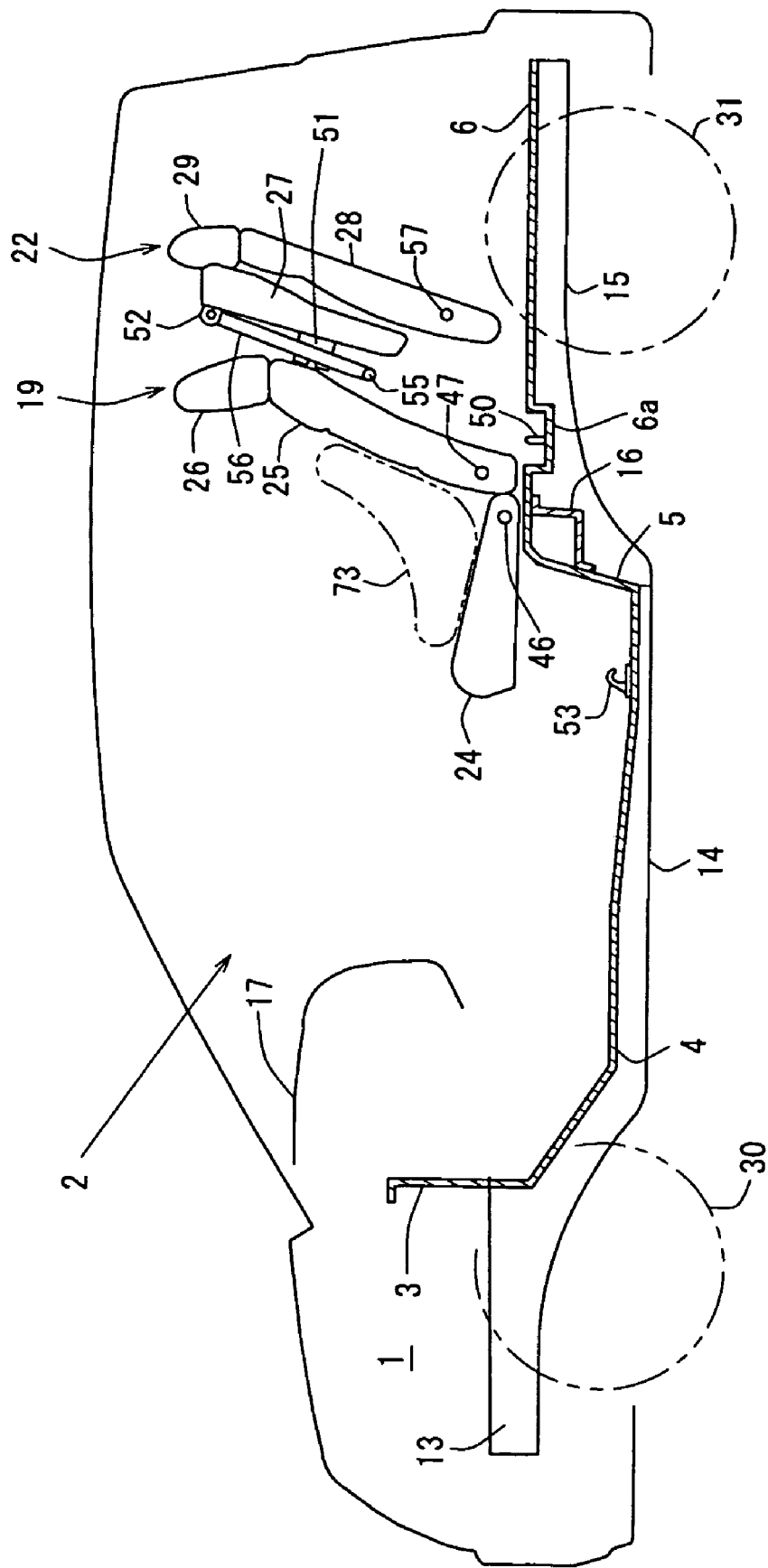
FIG. 14 is a side view illustrating further another seat arrangement.

Also, a child seat 73 may be installed on the assistant seat 19 located in the rear position near the rear floor 6 as illustrated in FIG. 14. In this case, a baby in the child seat 17 can be taken care of easily by a person from the side of the floor panel 4.

Figure 15:
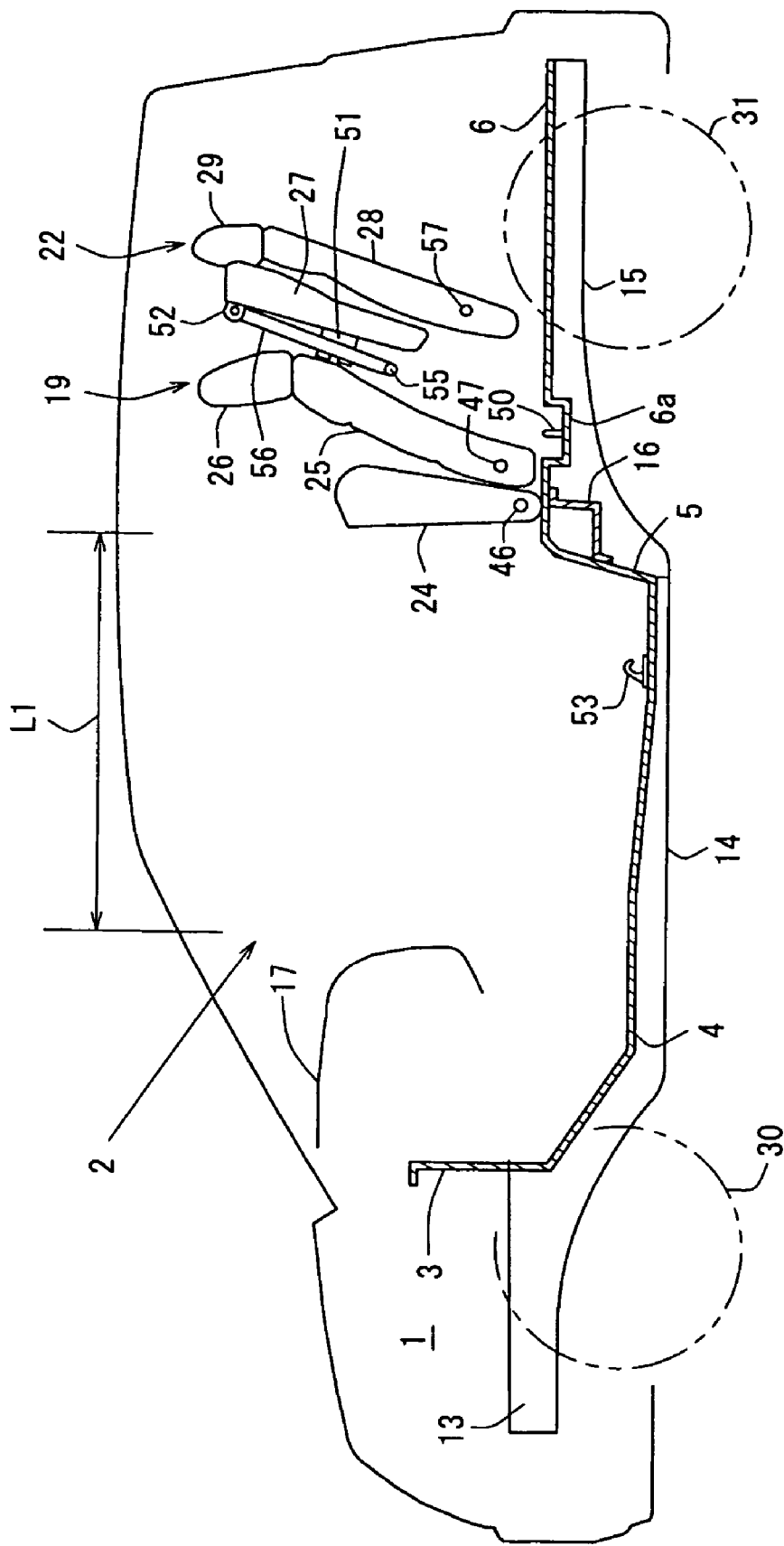
FIG. 15 is a side view illustrating further another seat arrangement.

Further, changing the seat cushion 24 of the assistant seat 19 in the tip-up position from the sate illustrated in FIG. 13 can provide further another seat arrangement illustrated in FIG. 15. Herein, since there can be provided a relatively long distance L1 between the instrument panel 17 and the seat cushion 24 of the assistant seat 19, relatively long things can be loaded properly in this place.

According to the above-described embodiments, there is provided the seat device for a vehicle, which is disposed on the floor panel 4 in the cabin 2 equipped with the instrument panel 17 at the front side, comprising the driver seat 18, the assistant seat 19 provided beside the driver seat 18, the assistant seat 19 being foldable and movable forward close to the instrument panel 17 so as to be located in the stored position α in which the length of the folded seat 19 is made short, and the rear seat (see the left seat 22) provided behind the assistant seat 19, the rear seat (see the left seat 22) being foldable and movable forward so as to be located in the stored position β which is located behind the stored position α of the assistant seat 19, wherein the assistant seat 19 in the stored position α and the rear seat (see the left seat 22) in the stored position β provide the substantially continuous storage space 70 (see FIG. 10) thereon which is formed by back faces of respective seat backs 25 and 28 of the assistant seat 19 and the rear seat (see the left seat 22).

In the present embodiment, the assistant seat 19 in the stored position is configured by the operation (tip-up) in such a manner that the seat cushion 24 is raised in the upright position facing to the seat back 25.

According to this structure, the assistant seat 19 is folded and moved forward to its stored position α close to the instrument panel 17, where the length of the folded seat 19 is made short.

Meanwhile, the rear seat (see the left seat 22) is folded and moved forward to its stored position β with the seat back 28 on the seat cushion 27 thereof. Thereby, the back faces of respective seat backs 25 and 28 of the assistant seat 19 and the rear seat (see the left seat 22) are formed in the substantially L shape.

Accordingly, the continuous storage space 70 is formed so as to extend from the original position of the assistant seat 19 in use to the rear position in the cabin 2, by the assistant seat 19 in its stored position α and the rear seat (see the left seat 22) in its stored position β. The large, flat and continuous load space can be formed in the longitudinal direction in the cabin 2, thereby improving both the large load space and the roomy cabin for passengers.

Further, there is provided the load floor (see the rear floor 6) in back of the rear seat (see the left seat 22) which is located at the higher level than the floor panel 4, and the substantially continuous load space is formed by the back face of the seat back 28 of the rear seat (see the left seat 22) in the stored position β and the load floor (see the rear floor 6).

According to this structure, since the back face of the seat back 28 of the rear seat (see the left seat 22) and the load floor (see the rear floor 6) are continuous, the flat and large load space (see the storage space 70) can be formed so as to be used properly. Also, the continuous load floor formed can improve the quality and storing function of the load space properly.

Further, the headrest 29 is provided at the top portion of the seat back 28 of the rear seat (see the left seat 22), and the rear seat (see the left seat 22) is configured such that the headrest 29 of the rear seat (see the left seat 22) in the stored position β is located between the assistant seat 19 in the stored position α and the floor panel 4.

According to this structure, since the headrest 29 of the rear seat (see the left seat 22) is located between the assistant seat 19 in the stored position α and the floor panel 4, there can be also the continuous face in the vehicle width direction.

Also, the rear seat (see the left seat 22) is configured such that the lower end of the assistant seat 19 in the stored position α contacts the front end of the seat back 28 of the rear seat (see the left seat 22) in the stored position β.

According to this structure, since substantially no gap exits between the lower end of the assistant seat 19 in the stored position α and the front end of the seat back 28 of the rear seat (see the left seat 22) in the stored position β, the utility and appearance can be improved properly.

Additionally, there are provided the slide rails 35 and 36 which support the assistant seat 19 movably between the above-described forward stored position α close to the instrument panel 17 and the backward position near the load floor (see the rear floor 6).

According to this structure, since the assistant seat 19 is movable in the longitudinal direction along the slide rails 35 and 36 between the forward stored position and the backward position, the proper seat arrangement can be provided.

The driver seat of the present invention corresponds to the driver seat 18 of the above described embodiment. Likewise, the assistant seat corresponds to the assistant seat 19, the rear seat corresponds to the left seat 22, the load floor corresponds to the rear floor 6, the headrest corresponds to the headrest 29. However, the present invention should not be limited to the above-described embodiments, any other modifications and improvements may be applied within the scope of a sprit of the present invention.

What is claimed is:

1. A seat device for a vehicle, which is disposed on a floor panel in a cabin equipped with an instrument panel at a front side, comprising:
   a driver seat;
   an assistant seat provided beside said driver seat, the assistant seat being guided by a slide rail mechanism so as to move forward close to the instrument panel to a stored position thereof, the assistant seat being configured to be foldable in such a manner that a seat cushion thereof is rotated around a pivot which is provided on a side of an upper rail of the slide rail mechanism and raised in an upright position facing to a seat back thereof at the stored position thereof; and
   a rear seat provided behind said assistant seat, the rear seat being supported by a support means so as to move forward to a stored position thereof, the rear seat being configured to be foldable in such a manner that a seat back thereof is rotated forward and folded on a seat cushion thereof at the stored position thereof which is located behind said stored position of the assistant seat, wherein said assistant seat in the stored position and said rear seat in the stored position provide a substantially continuous storage space thereon which is formed by back faces of respective seat backs of said assistant seat and said rear seat in such a manner that a lower end of the assistant seat in the stored position contacts a front end of the seat back of the rear seat in the stored position.

2. The seat device for a vehicle of claim 1, wherein said support means which supports the rear seat so that the rear seat can move forward to the stored position is a link mechanism.

3. A seat device for a vehicle, which is disposed on a floor panel in a cabin equipped with an instrument panel at a front side, comprising:

a driver seat;

an assistant seat provided beside said driver seat, the assistant seat being guided by a slide rail mechanism so as to move forward close to the instrument panel to a stored position thereof, the assistant seat being configured to be foldable in such a manner that a seat cushion thereof is rotated around a pivot which is provided on a side of an upper rail of the slide rail mechanism and raised in an upright position facing to a seat back thereof at the stored position thereof; and a rear seat provided behind said assistant seat, the rear seat being supported by a support means so as to move forward to a stored position thereof, the rear seat being configured to be foldable in such a manner that a seat back thereof is rotated forward and folded on a seat cushion thereof at the stored position thereof which is located behind said stored position of the assistant seat, wherein said assistant seat in the stored position and said rear seat in the stored position provide a substantially continuous storage space thereon which is formed by back faces of respective seat backs of said assistant seat and said rear seat, wherein a headrest is provided at a top portion of the seat back of said rear seat, and said rear seat is configured such that said headrest of said rear seat in the stored position is located between the said assistant seat in the stored position and the floor panel.

4. The seat device for a vehicle of claim 3, wherein said rear seat is configured such that a lower end of said assistant seat in the stored position contacts a front end of said seat back of the rear seat in the stored position.

5. The seat device for a vehicle of claim 3, wherein said support means which supports the rear seat so that the rear seat can move forward to the stored position is a link mechanism.

6. A seat device for a vehicle, which is disposed on a floor panel in a cabin equipped with an instrument panel at a front side, comprising:

a driver seat;

an assistant seat provided beside said driver seat, the assistant seat being guided by a slide rail mechanism so as to move forward close to the instrument panel to a stored position thereof, the assistant seat being configured to be foldable in such a manner that a seat cushion thereof is rotated around a pivot which is provided on a side of an upper rail of the slide rail mechanism and raised in an upright position facing to a seat back thereof at the stored position thereof; and a rear seat provided behind said assistant seat, the rear seat being supported by a support means so as to move forward to a stored position thereof, the rear seat being configured to be foldable in such a manner that a seat back thereof is rotated forward and folded on a seal cushion thereof at the stored position thereof which is located behind said stored position of the assistant seat, wherein said assistant seat in the stored position and said rear seat in the stored position provide a substantially continuous storage space thereon which is formed by back faces of respective seat backs of said assistant seat and said rear seat, wherein there is provided a load floor in back of said rear seat which is located at a higher level than the floor panel, and a substantially continuous load space is formed by the back face of the seat back of said rear seat in the stored position and said load floor.

7. The seat device for a vehicle of claim 6, wherein said support means which supports the rear seat so that the rear seat can move forward to the stored position is a link mechanism.

8. The seat device for a vehicle of claim 6, wherein a headrest is provided at a top portion of the seat back of said rear seat, and said rear seat is configured such that said headrest of said rear seat in the stored position is located between the said assistant seat in the stored position and the floor panel.

9. The seat device for a vehicle of claim 8, wherein said rear seat is configured such that a lower end of said assistant seat in the stored position contacts a front end of said seat back of the rear seat in the stored position.

* * * * *